US012586329B2

(12) United States Patent
Bai et al.

(10) Patent No.: US 12,586,329 B2
(45) Date of Patent: Mar. 24, 2026

(54) MODELING METHOD, DEVICE, AND SYSTEM FOR THREE-DIMENSIONAL HEAD MODEL, AND STORAGE MEDIUM

(71) Applicant: BOE TECHNOLOGY GROUP CO., LTD., Beijing (CN)

(72) Inventors: Hua Bai, Beijing (CN); Jinan Li, Beijing (CN); Yangyang Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 837 days.

(21) Appl. No.: 17/631,480

(22) PCT Filed: Mar. 26, 2021

(86) PCT No.: PCT/CN2021/083329
§ 371 (c)(1),
(2) Date: Jan. 30, 2022

(87) PCT Pub. No.: WO2021/197230
PCT Pub. Date: Oct. 7, 2021

(65) Prior Publication Data
US 2022/0277586 A1     Sep. 1, 2022

(30) Foreign Application Priority Data
Mar. 30, 2020    (CN) .......................... 202010239471.3

(51) Int. Cl.
*G06T 19/20*      (2011.01)
*G06V 10/82*      (2022.01)
(Continued)

(52) U.S. Cl.
CPC .............. *G06T 19/20* (2013.01); *G06V 10/82* (2022.01); *G06V 20/647* (2022.01);
(Continued)

(58) Field of Classification Search
CPC ............. G06T 19/20; G06T 2219/2004; G06T 2219/2021; G06T 17/00; G06T 2200/04;
(Continued)

(56) References Cited

U.S. PATENT DOCUMENTS

2018/0253593 A1*   9/2018   Hu ........................ G06V 40/165
2019/0035149 A1*   1/2019   Chen .................... G06V 40/166
(Continued)

FOREIGN PATENT DOCUMENTS

| CN | 102663820 A | 9/2012 |
|----|-------------|--------|
| CN | 107452049 A | 12/2017 |
| CN | 109978930 A | 7/2019 |

*Primary Examiner* — Andrew M Moyer
*Assistant Examiner* — Ahmed A Nasher
(74) *Attorney, Agent, or Firm* — HOUTTEMAN LAW LLC

(57) ABSTRACT

Provided are a method, device, system for modeling a three-dimensional head model, and a storage medium. The modeling method includes: acquiring at least one facial image of a user; acquiring facial contour feature points in the at least one facial image of the user, the facial contour feature points being capable of characterizing a contour of a face or contours of five sense organs of the user; selecting a standard three-dimensional head model according to the facial contour feature points; acquiring facial local feature points in the at least one facial image of the user, the facial local feature points being capable of reflecting refined features of face shape and refined features of the five sense organs of the user; correcting the selected standard three-dimensional head model according to the facial local feature points, to obtain a three-dimensional head model conforming to facial features of the user.

14 Claims, 10 Drawing Sheets

(51) Int. Cl.
    *G06V 20/64*      (2022.01)
    *G06V 40/16*      (2022.01)
(52) U.S. Cl.
    CPC .......... *G06V 40/165* (2022.01); *G06V 40/171* (2022.01); *G06T 2200/04* (2013.01); *G06T 2200/08* (2013.01); *G06T 2219/2021* (2013.01)
(58) Field of Classification Search
    CPC ... G06T 2200/08; G06T 15/04; G06T 17/205; G06T 2207/30201; G06V 20/647; G06V 40/176; G06V 40/165; G06V 40/171
    See application file for complete search history.

(56)            References Cited

U.S. PATENT DOCUMENTS

| | | | |
|---|---|---|---|
| 2020/0020173 A1* | 1/2020 | Sharif | G06T 19/20 |
| 2021/0183141 A1* | 6/2021 | Zhou | G06T 7/73 |
| 2022/0044491 A1* | 2/2022 | Lin | G06T 19/20 |
| 2022/0058407 A1* | 2/2022 | Yang | G06V 40/18 |
| 2022/0375258 A1* | 11/2022 | Hua | G06V 40/171 |

* cited by examiner

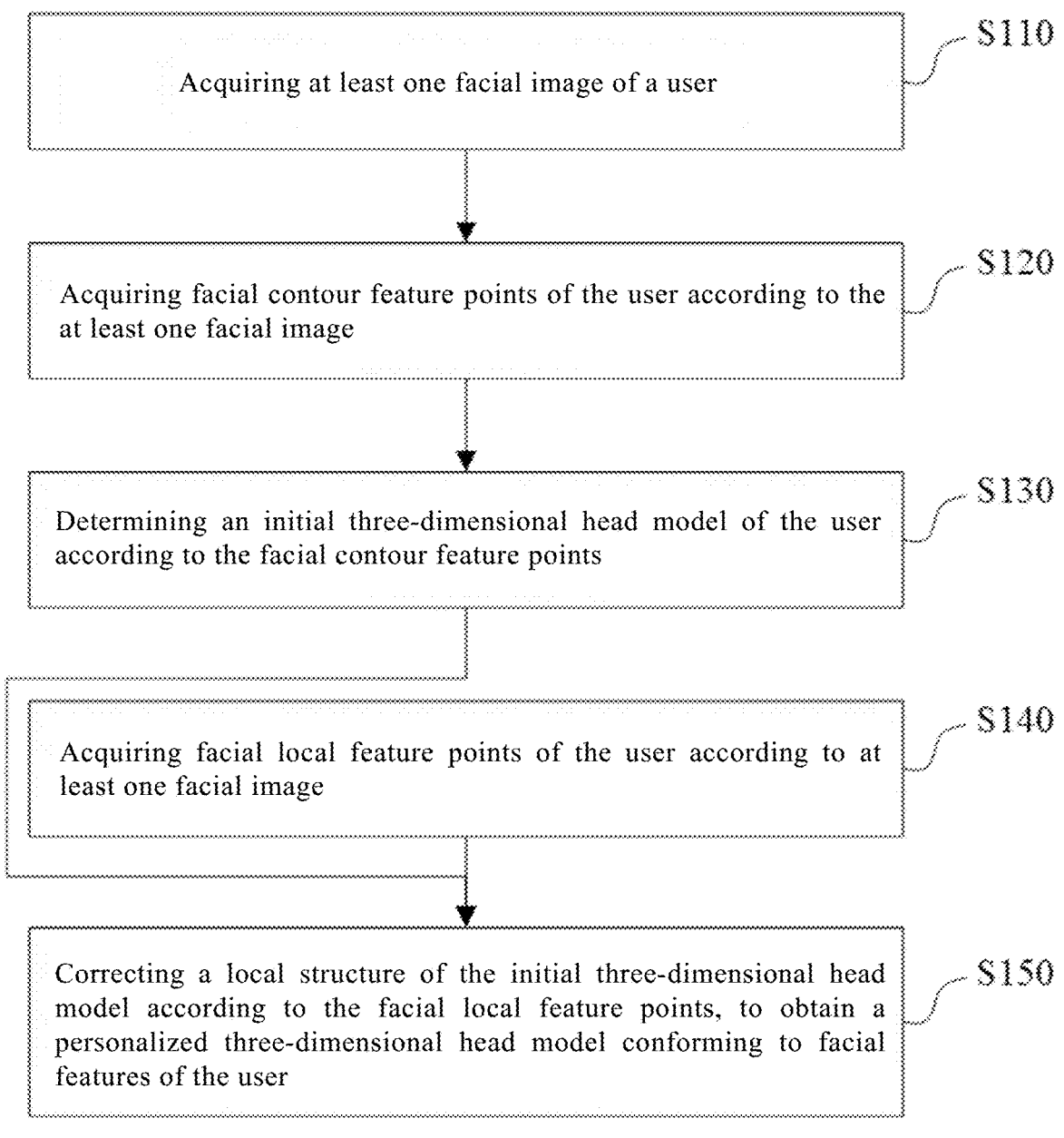

S110

Acquiring at least one facial image of a user

S120

Acquiring facial contour feature points of the user according to the at least one facial image

S130

Determining an initial three-dimensional head model of the user according to the facial contour feature points

S140

Acquiring facial local feature points of the user according to at least one facial image

S150

Correcting a local structure of the initial three-dimensional head model according to the facial local feature points, to obtain a personalized three-dimensional head model conforming to facial features of the user

FIG.1

| Comparing positional features of multiple facial local feature points with positional features of multiple bone points on the initial three-dimensional head model | S151 |

| Adjusting a bone point with a positional feature to be consistent with a positional feature of a facial local feature point, to obtain an adjusted first three-dimensional head model | S152 |

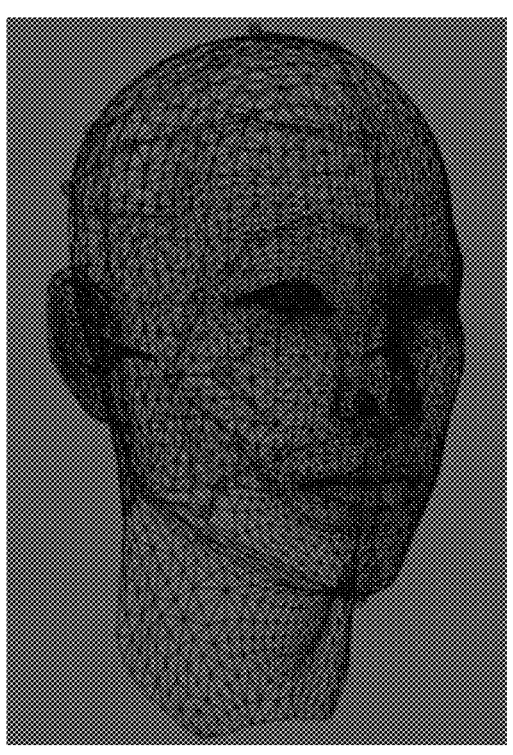

FIG.8

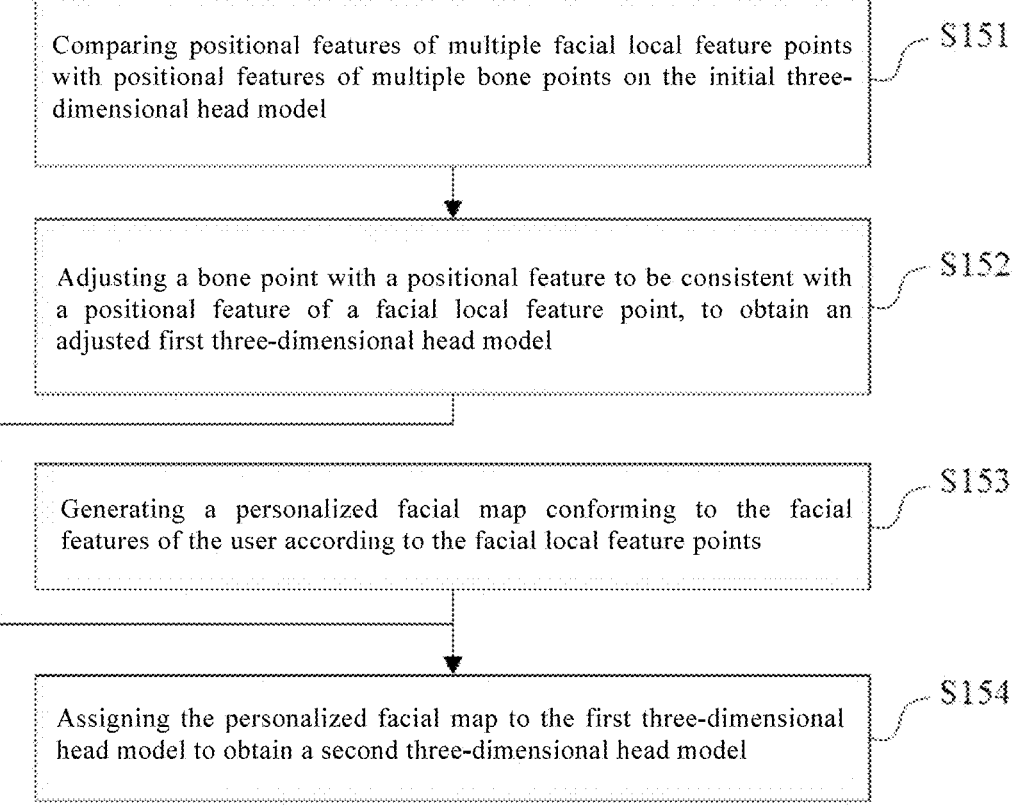

Comparing positional features of multiple facial local feature points with positional features of multiple bone points on the initial three-dimensional head model · S151

Adjusting a bone point with a positional feature to be consistent with a positional feature of a facial local feature point, to obtain an adjusted first three-dimensional head model · S152

Generating a personalized facial map conforming to the facial features of the user according to the facial local feature points · S153

Assigning the personalized facial map to the first three-dimensional head model to obtain a second three-dimensional head model · S154

FIG.9

MODELING METHOD, DEVICE, AND SYSTEM FOR THREE-DIMENSIONAL HEAD MODEL, AND STORAGE MEDIUM

CROSS-REFERENCE TO RELATED APPLICATION

The present application claims the priority of Chinese Patent Application No. 202010239471.3 filed on Mar. 30, 2020, the contents of which are incorporated herein in their entirety by reference.

TECHNICAL FIELD

The present disclosure relates to the field of image processing technology, and in particular to a modeling method, a modeling device, a modeling system for a three-dimensional head model, and a storage medium.

BACKGROUND

Currently, the head model constructed by an existing head model modeling method on the market has a low matching degree with the actual human head. It is usually only modeled for the part of the human head instead of the whole of the human head. The model constructed in this way cannot show the overall characteristics of the human head, and has a low matching degree with the real human body; in addition, when modeling, the current method usually constructs the points and sides of the model based on the point positions of the actual human head. In order to improve the reality, the number of sides of the model needs to be increased, and increasing the number of sides requires more head point positions. Due to the large amount of overall data, the amount of calculation is large, and it cannot be transmitted quickly to achieve real-time rendering and rapid product implementation. Meanwhile, the large amount of calculation relies heavily on the server, resulting in slow transmission speed, and the user side cannot display it in real time.

Another existing head model modeling method reduces the amount of data and solves the problem of large amount of calculation, but most of the generated models are cartoon models, which have low model quality, specifically, have low reality and poor interaction effects.

SUMMARY

In an aspect, provided is a modeling method for a three-dimensional head model which includes: acquiring at least one facial image of a user; acquiring facial contour feature points in the at least one facial image of the user, the facial contour feature points being capable of characterizing a contour of a face or contours of five sense organs of the user; selecting a standard three-dimensional head model according to the facial contour feature points; acquiring facial local feature points in the at least one facial image of the user, the facial local feature points being capable of reflecting refined features of face shape and refined features of the five sense organs of the user; and correcting the selected standard three-dimensional head model according to the facial local feature points, to obtain a three-dimensional head model conforming to facial features of the user.

In an embodiment, the selecting a standard three-dimensional head model according to the facial contour feature points includes: matching coordinates of multiple bone points of a standard three-dimensional head models stored in a model database with coordinates of the facial contour feature points in the at least one facial image under a same reference coordinate system, the bone points being capable of characterizing a contour of a face or contours of five sense organs of a standard three-dimensional head model; and selecting a standard three-dimensional head model from the multiple standard three-dimensional head models such that the coordinates of the bone points of the standard three-dimensional head model have a highest matching degree with the coordinates of the facial contour feature points.

In an embodiment, the correcting the selected standard three-dimensional head model according to the facial local feature points includes: comparing coordinates of multiple facial local feature points in the at least one facial image with coordinates of multiple bone points of the selected standard three-dimensional head model under a same reference coordinate system; and adjusting the coordinates of a bone point with inconsistent coordinates in the selected standard three-dimensional head model to be consistent with the coordinates of a corresponding facial local feature point, to obtain an adjusted first three-dimensional head model.

In an embodiment, correcting the selected standard three-dimensional head model according to the facial local feature points to obtain a three-dimensional head model conforming to the facial features of the user further includes: generating a personalized facial map conforming to the facial features of the user according to the multiple facial local feature points, the personalized facial map being a UV texture map composed of multiple grids, the personalized facial map including multiple personalized feature points, wherein the multiple personalized feature points are vertices of the multiple grids on the UV texture map and are used to characterize positions of the five sense organs; and overlaying the personalized facial map on the first three-dimensional head model according to a one-to-one correspondence relationship between the multiple personalized feature points of the personalized facial map and the multiple bone points of the first three-dimensional head model, to obtain a three-dimensional head model of the user.

In an embodiment, generating the personalized facial map conforming to the facial features of the user according to the multiple facial local feature points includes: unfolding an outer surface of the selected standard three-dimensional head model in a two-dimensional plane to obtain an initial facial map, the initial facial map being a UV texture map composed of multiple grids, the initial facial map including multiple map feature points, the multiple map feature points are vertices of the two-dimensional multiple grids on the UV texture map and are used to characterize the positions of the five sense organs, and the vertices of the two-dimensional multiple grids of the initial facial map being a one-to-one correspondence with three-dimensional vertices on the selected standard three-dimensional head model; and adjusting the multiple map feature points on the initial facial map according to the multiple facial local feature points, to generate the adjusted personalized facial map.

In an embodiment, the adjusting the multiple map feature points on the initial facial map according to the multiple facial local feature points includes: determining whether the coordinates of the multiple facial local feature points are consistent with coordinates of the multiple map feature points; adjusting coordinates of a map feature point with inconsistent coordinates in the initial facial map to be consistent with the coordinates of a corresponding facial local feature point, the map feature point and the corresponding facial local feature point being capable of characterizing a same position of a same sense organ.

In an embodiment, adjusting the multiple map feature points on the initial facial map according to the multiple facial local feature points includes: determining whether colors and brightnesses of pixels at the multiple facial local feature points are consistent with colors and brightnesses of pixels at the multiple map feature points, respectively; and adjusting the color and brightness of a map feature point with inconsistent color and brightness in the initial facial map to be consistent with the color and brightness of a corresponding facial local feature point.

In an embodiment, selecting the standard three-dimensional head model from the model database such that the coordinates of the bone points of the standard three-dimensional head model have a highest matching degree with the coordinates of the facial contour feature points includes: comparing first coordinates of a bone point of the standard three-dimensional head model with second coordinates of a corresponding facial contour feature point in a same reference coordinate system, wherein the bone point and the corresponding facial contour feature point are are capable of characterizing a same position on the contour of the face or on the contours of the five sense organs; and determining whether a difference between the first coordinates and the second coordinates is within a first threshold, and if the difference falls within the first threshold, the matching degree is high.

In an embodiment, acquiring the at least one facial image of the user includes: capturing a front image and at least one side image of the user.

In an embodiment, acquiring the at least one facial image of the user includes: acquiring a front image and at least one side image of the user that are stored in advance.

In an embodiment, acquiring the facial contour feature points in the at least one facial image of the user includes: recognizing the facial contour feature points of the user in the at least one facial image according to a trained first image recognition model.

In an embodiment, acquiring the facial local feature points in the at least one facial image of the user includes: recognizing the facial local feature points of the user in the at least one facial image according to a trained second image recognition model.

In another aspect, provided is a device for modeling a three-dimensional head model which includes: an image acquisition component configured to acquire at least one facial image of a user; a first feature acquisition component configured to acquire facial contour feature points in the at least one facial image of the user, the facial contour feature points being capable of characterizing a contour of a face or contours of five sense organs of the user; a model determination component configured to select a standard three-dimensional head model according to the facial contour feature points; a second feature acquisition component configured to acquire facial local feature points in the at least one facial image of the user, the facial local feature points being capable of reflecting refined features of face shape and refined features of the five sense organs of the user; a model modeling component configured to correct the selected standard three-dimensional head model according to the facial local feature points, to obtain a three-dimensional head model conforming to facial features of the user.

In still another aspect, provided is a modeling system for a three-dimensional head model including: an input unit, a storage, a processor and a display unit. The input unit, the storage and the display unit are all electrically connected to the processor. The input unit is configured to acquire at least one facial image of a user. The storage stores a computer program, when executed by the processor, the computer program implements the aforementioned modeling method for a three-dimensional head model. The display unit is configured to display a three-dimensional head model constructed by the processor according to the modeling method for a three-dimensional head model.

In an embodiment, the storage further stores a model database with multiple standard three-dimensional head models stored therein.

In another embodiment, provided is a computer storage medium storing a computer program, when executed by a processor, the computer program implements the aforementioned modeling method for a three-dimensional head model.

BRIEF DESCRIPTION OF DRAWINGS

FIG. 1 is a flowchart of a modeling method for a three-dimensional head model according to an embodiment of the present disclosure;

FIG. 8 is a schematic diagram of a first three-dimensional head model according to an embodiment of the present disclosure;

FIG. 9 is a flowchart of a modeling method for a second three-dimensional head model according to an embodiment of the present disclosure;

DETAIL DESCRIPTION OF EMBODIMENTS

Figure 2:
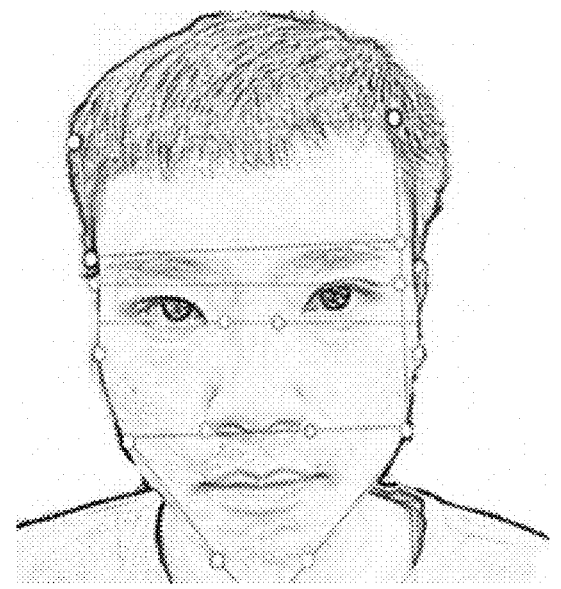
FIG. 2 is a schematic diagram of facial contour feature points of a front image according to an embodiment of the present disclosure.

In order to enable those skilled in the art to better understand the technical solutions of the present disclosure, the present disclosure will be further described in detail below with reference to the accompanying drawings and specific implementations.

The embodiments of the present disclosure provide a modeling system for a three-dimensional head model, which is used to perform a modeling method for a three-dimensional head model; the modeling system may be a separate terminal device, or may include a cloud device and a terminal device. The specific content will be introduced later, and thus will not be repeated here.

An embodiment of the present disclosure provides a modeling method for a three-dimensional head model. As shown in FIG. 1, the modeling method for a three-dimensional head model includes steps S110 to S150.

At step S110, at least one facial image of a user is acquired.

In an optional implementation, a front image and at least one side image of the user are acquired, e.g., captured.

The front image may reflect the user's front features, such as face shape, five sense organs, and fatness. At least one side image may reflect characteristics of the user's side and back of the head, such as characteristics of the overall outline of the head from the front to the back, characteristics of ears, and characteristics of hair. The combination of the front image and the side image can reflect the whole characteristics of the user's head, and provide comprehensive basic data for the modeling of the three-dimensional head model. The more side images, the richer the basic data, and the more beneficial it is to the modeling of the three-dimensional head model.

In another optional implementation, a designated side image and a front image of the user are acquired.

The designated side image may be a side image stored in advance, which may be a side image of the current user or a side image of another user stored in advance; the designated side image may also be an image generated according to the set default pixel value and stored in advance. The combination of the designated side image and the user's front image can supplement other head features on the basis of the user's facial features, thereby providing a comprehensive data of the whole head. In a case of only high requirement for facial features or missing the user's side image, the designated side image can be used as a supplement.

Based on the front image and the side image (i.e., the user's side image or the designated side image), three-dimensional coordinates of the feature points that are helpful to construct a three-dimensional head model can be extracted. Specifically, the coordinates of two dimensions can be extracted based on the front image, which can be represented by (x, y). The coordinate of the third dimension can be extracted based on the side image, which can be represented by z. Then a three-dimensional coordinate (x, y, z) can be obtained.

At step S120, facial contour feature points of the user are acquired according to the at least one facial image.

Optionally, the facial contour feature points of the user are recognized in the at least one facial image, according to a trained first image recognition model.

Figure 3:
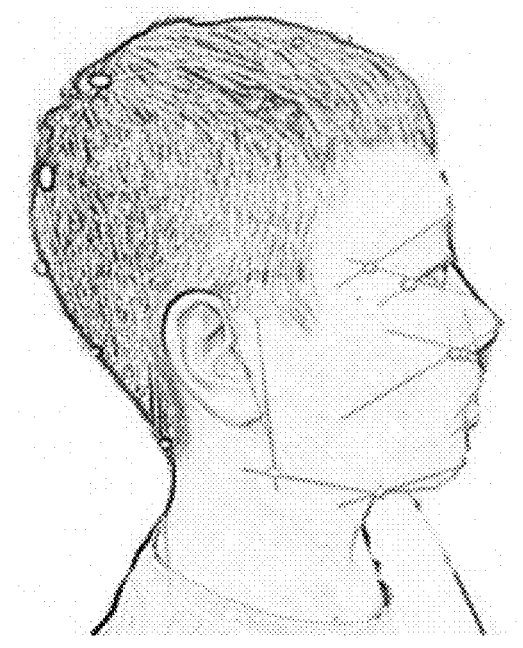
FIG. 3 is a schematic diagram of facial contour feature points of a side image according to an embodiment of the present disclosure.

The facial contour feature points may be the feature points that reflect the overall contour of the front and the overall contour of the side, as well as the contours of the five sense organs. FIGS. 2 and 3 show an exemplary diagram of the facial contour feature points of the front image and the facial contour feature points of the side image, respectively. Dots in FIGS. 2 and 3 are the facial contour feature points acquired and marked.

Optionally, the principle of the first image recognition model is deep learning, and the first image recognition model may be a variety of neural network models, such as a convolutional neural network model. The training principle is generally as follows:

A large number of facial images (specifically, the pixel values of the facial image) marked with facial contour feature points (marked points may be points of a certain special shape or in a certain special color) are input into the first image recognition model for training. The first image recognition model classifies the points in the facial image according to the input pixel values, and outputs a label map containing the classification result obtained on the basis of the input image. The label map has labels of different classifications, for example, a label map marked with 0 and 1 is output, where 1 is used to mark the facial contour feature points recognized by the first image recognition model, and 0 is used to mark other feature points except facial contour feature points. Based on a same coordinate system, the marked positions of the facial contour feature points in the output label map are compared with the marked positions of the facial contour feature points in the actual facial image (that is, the input facial image), to calculate a loss function, and parameters of layers in the first image recognition model are updated according to the loss function.

The training of the first image recognition model is an existing method. Those skilled in the art can understand that the convolutional neural network can be applied to the specific method for training in this disclosure, which will not be repeated in this disclosure; in addition, those skilled in the art can understand that when different neural network models are used, there are also certain differences in training methods, which will not be introduced in the present disclosure.

Extracting the facial contour feature points of the facial images based on deep learning can improve the accuracy and efficiency of feature extraction.

At step S130, an initial three-dimensional head model of the user is determined according to the facial contour feature points, and then proceed to step S150.

Optionally, the bone points of standard head models in the model database are matched with the facial contour feature points; a standard head model with the highest matching degree with the facial contour feature points is selected as the initial three-dimensional head model.

In an optional implementation, the coordinates of the bone points of each standard three-dimensional head model in a first coordinate system (for example, the two-dimensional coordinate system or the three-dimensional coordinate system) are matched with the coordinates of the facial contour feature points in the first coordinate system, that is, the coordinates of the point positions are matched based on the same coordinate system.

In another optional implementation, the coordinates of the bone points of each standard three-dimensional head model in the first coordinate system are match with the coordinates of the facial contour feature points in a second coordinate system, wherein the first coordinate system is a coordinate system set up based on the characteristics of the standard three-dimensional head model, and the second coordinate system is a coordinate system set up based on the facial image. In the matching process, the coordinates of the bone points in the first coordinate system are converted into coordinates in the second coordinate system, and then matched with the coordinates of the facial contour feature points in the second coordinate system.

Optionally, the standard head models in the model database are constructed in advance, and the modeling principle is as follows:

acquiring multiple sets of head bone point parameters, wherein each set of head bone point parameters includes the coordinates (i.e., the coordinates in the three-dimensional coordinate system, which can be represented by (x, y, z)) of multiple bone points that can characterize the head skeleton feature or bone feature, each bone point is set with a corresponding skin weight. A whole three-dimensional head model can be constructed based on each set of head bone point parameters and the corresponding skin weights (representing the correspondence relationship between the point positions of the bones and the three-dimensional model). The multiple three-dimensional head models constructed based on multiple sets of head bone point parameters are stored as standard three-dimensional head models in the model database. The acquired multiple sets of head bone point parameters can be set according to actual needs or empirical values, and the skin weight of each bone point can be set according to actual needs or empirical values.

Figure 4:
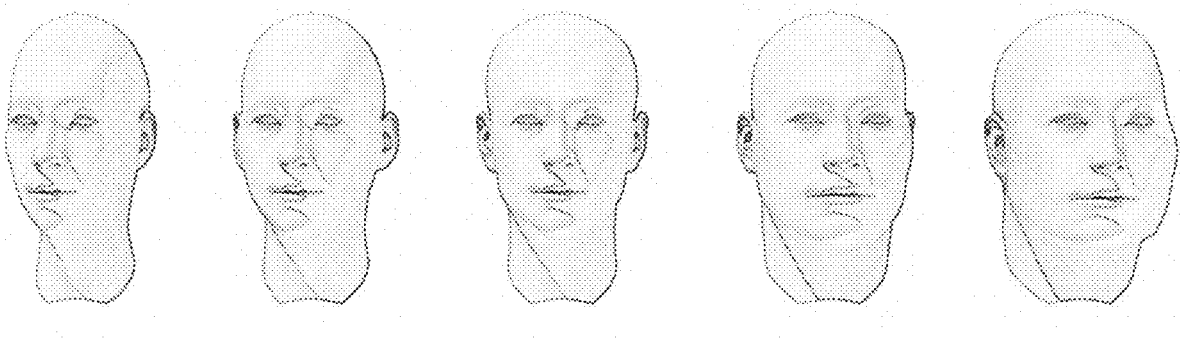
FIG. 4 is a schematic diagram of a standard three-dimensional head model in a model database according to an embodiment of the present disclosure.
Figure 5:
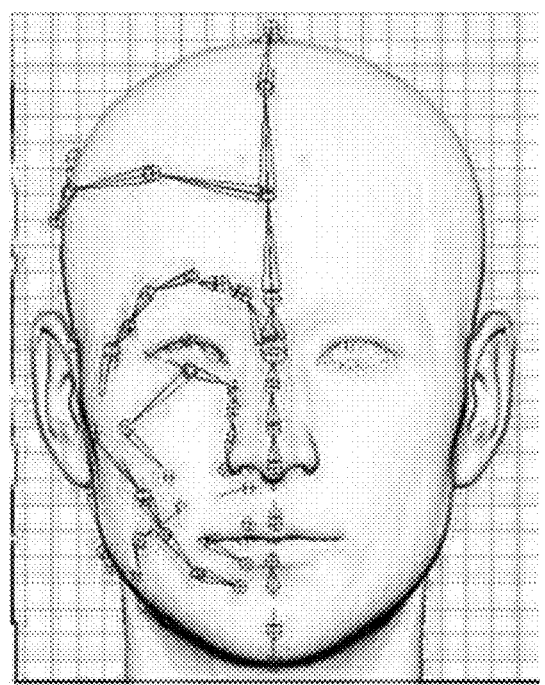
FIG. 5 is a schematic diagram of an initial three-dimensional head model according to an embodiment of the present disclosure.

The model database obtained by the above method contains standard head models with different facial features (such as different face shapes or different fatnesses). FIG. 4 shows some the standard head models, and the initial three-dimensional head model selected from the standard head models is shown in FIG. 5.

Optionally, the coordinates of the bone points of each standard head model and the corresponding facial contour feature points are compared based on the same reference coordinate systems. The bone points may characterize the contour of the face or the contours of the five sense organs of the standard head model. For example, the bone point characterizing the chin or chin bone in the standard head model are compared with the feature point characterizing the chin in the facial contour feature points to determine whether the coordinate difference between the bone point of the standard head model and the facial contour feature point is within a predetermined threshold. If the coordinate difference falls within the predetermined threshold, the matching degree is higher.

The number of model bone points is much less than the number of sides of the model. By matching the facial contour feature points with the bone points of the standard head model, it is unnecessary for matching for the sides of the model, which can greatly reduce the amount of calculation and reduce the dependence on the server, and thus beneficial to realize rapid transmission; in addition, since each bone point is set with a skin weight, only in the case of matching with the bone points, the matching degree between the facial contour feature points and the overall standard head model can also be ensured to ensure the basic model quality; the initial three-dimensional head model thus selected can provide a basis for the subsequent generation of a personalized three-dimensional head model and ensure the benchmark of facial deformation.

At step S140, facial local feature points of the user are acquired according to at least one facial image.

Optionally, the facial local feature points of the user are recognized in at least one facial image according to a trained second image recognition model.

The facial local feature points may be refined feature points that reflect the local refined features of the face, such as the refined feature points of the face shape and the refined feature points of the five sense organs. In an optional implementation, the number of facial local feature points is greater than the number of facial contour feature points, and the facial local feature points may include facial contour feature points, or may be feature points that are different from the facial contour feature points.

Figures 6, 7:
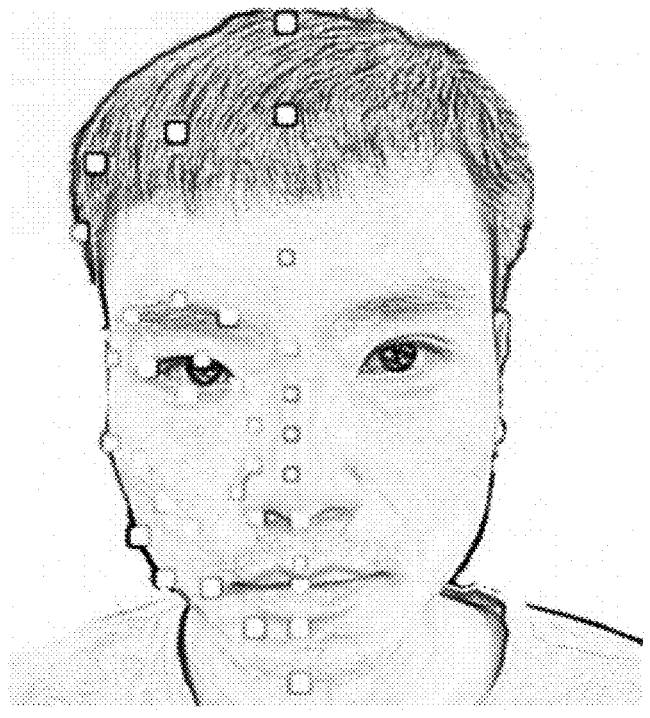
FIG. 6 is a schematic diagram of facial local feature points of a facial image according to an embodiment of the present disclosure.
FIG. 7 is a flowchart of a modeling method for a first three-dimensional head model according to an embodiment of the present disclosure.

FIG. 6 shows an exemplary diagram of facial local feature points. The square mark points in FIG. 6 are the acquired and marked facial local feature points. In a specific example, 98 facial local feature points can be acquired.

Optionally, the principle of the second image recognition model is deep learning, and the second image recognition model can be a variety of neural network models, such as a convolutional neural network model. The training principle is similar to that of the first image recognition model and will not be repeated here.

The second image recognition model may use the same or different neural network model as the first image recognition model, which is not limited in the embodiment of the present disclosure.

Extracting facial local feature points of facial images based on deep learning can improve the accuracy and efficiency of feature extraction.

At step S150, a local structure of the initial three-dimensional head model is corrected according to the facial local feature points, to obtain a personalized three-dimensional head model matching with the facial features of the user.

FIG. 7 is a flowchart of a modeling method for a first three-dimensional head model according to an embodiment of the present disclosure. As shown in FIG. 7, according to the facial local feature points, the local structure of the initial three-dimensional head model is corrected to obtain a personalized three-dimensional head model that conforms to the facial features of the user. The facial model remodeling shown in FIG. 7 specifically includes the following steps S151-S152.

At step S151, positional features of multiple facial local feature points in the facial image of the user are compared with positional features of multiple bone points on the initial three-dimensional head model (i.e., the selected standard three-dimensional head model).

Optionally, the coordinates of multiple facial local feature points are compared with the coordinates of corresponding multiple bone points of the initial three-dimensional head model under the same reference coordinate system (for example, a three-dimensional coordinate system). For example, the coordinates of the feature points around the eyes in the facial image are compared with the coordinates of the bone points around the eyes in the initial three-dimensional head model.

Optionally, during the comparison, the initial three-dimensional head model used may be the standard model with the highest matching degree with the facial contour feature points in the aforementioned model database, or alternatively may be other standard models.

At step S152, with a positional feature of a bone point being inconsistent with a positional feature of a corresponding facial local feature point, the positional feature of the bone point with is adjusted to be consistent with the positional feature of the corresponding facial local feature point, so as to obtain an adjusted first three-dimensional head model.

Optionally, as for bone points with different coordinates, their coordinates of the bone points with different coordinates are adjusted to be the same as the coordinates of the corresponding facial local feature points, and the adjusted first three-dimensional head model obtained is a personalized three-dimensional model that conform to the user's facial features. One bone point and one corresponding facial local feature point may characterize the same position of the same sense organ of the user.

For example, if the coordinates of the bone points around the eyes in the initial three-dimensional head model are different from the coordinates of the bone points around the eyes in the facial image, then the coordinates of the bone points around the eyes in the initial three-dimensional head model are adjusted or moved to be the same as the coordinates of the bone points around the eyes in the facial image, so that the eyes in the first three-dimensional head model obtained are closer to the eyes of the real person in the facial image. The adjustment of the bone points in other regions is the same.

The adjusted first three-dimensional head model obtained is shown in FIG. 8. The local skeletal structure of this model conforms more to the local features of the real person in the facial image, so that the reality of the first three-dimensional head model is higher, which helps to improve the interactivity; and the amount of data of the involved facial local feature points and bone points is much less than that in the related art, which can greatly reduce the amount of calculation, improve the calculation speed and transmission speed on the basis of the improvement of the model reality, and further improve the interactivity.

Optionally, as shown in FIG. 9, on the basis of steps S151 to S152, correcting the local structure of the initial three-dimensional head model according to the facial local feature points to obtain the personalized three-dimensional head model conforming to the facial features of the user further includes the following steps S153 to S154.

At step S153, a personalized facial map conforming to the facial features of the user is generated according to the facial local feature points.

The embodiment of the present disclosure does not limit the execution order of step S153, and step S151 and step S152. Step S153 can be executed after step S152 or before step S151, or can be executed simultaneously with step S151 or step S152.

Optionally, according to the facial local feature points, map feature points on an initial facial map that has a mapping relationship with the initial three-dimensional head model are adjusted to generate an adjusted personalized facial map.

Optionally, adjusting the map feature points on the initial facial map corresponding to the initial three-dimensional head model according to the facial local feature points includes: determining whether positional features of the multiple facial local feature points are consistent with positional features of the multiple map feature points; adjusting the positional features of the map feature points with inconsistent positional features to be consistent with the positional features of the corresponding facial local feature points.

Figure 10:
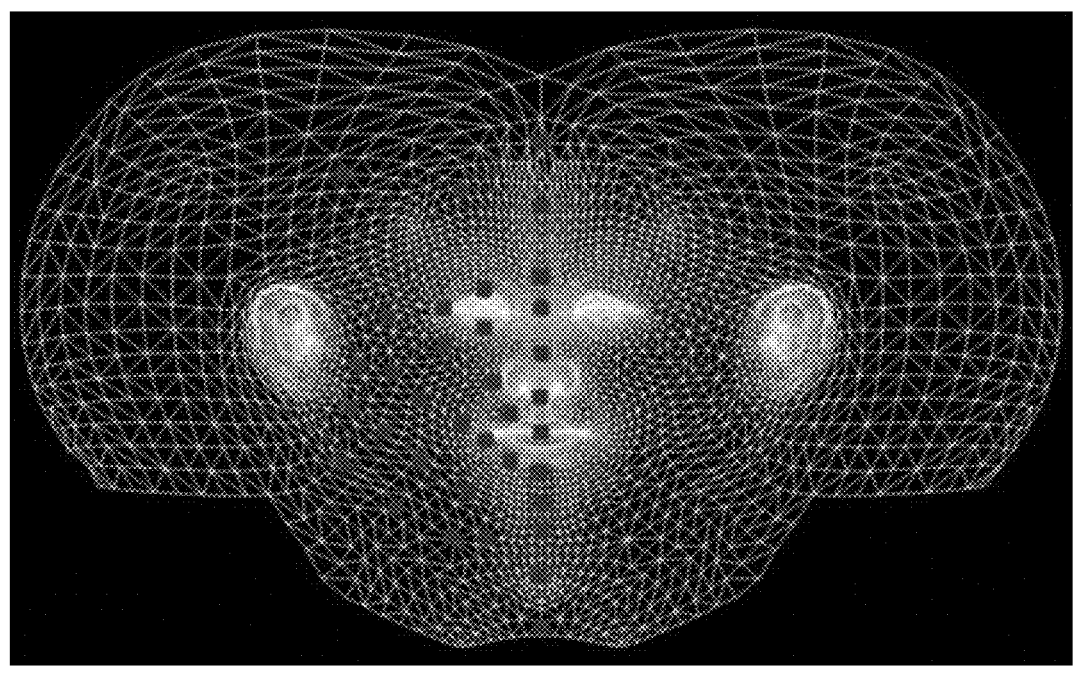
FIG. 10 is a schematic diagram of an initial facial map according to an embodiment of the present disclosure.

Optionally, as shown in FIG. 10, the initial facial map is a UV texture map composed of multiple grids, and the map feature points are vertices of the grids on the UV texture map. In FIG. 10, square mark points may represent the map feature points corresponding to the facial local feature points in the facial image, that is, the map feature points to be adjusted.

Optionally, the mapping relationship between the initial three-dimensional head model and the initial facial map is specifically a mapping relationship between the coordinates of three-dimensional vertices in the outer surface of the initial three-dimensional head model and the coordinates of two-dimensional grid vertices of the initial facial map.

In one example, the initial facial map is specifically a map obtained by unfolding the outer surface of the initial three-dimensional head model in a two-dimensional plane. The two-dimensional grid vertices in the initial facial map are in a one-to-one correspondence with the three-dimensional vertices on the initial three-dimensional head model. In actual operation, an existing software such as 3dmax or Unity can be used to realize the two-dimensional unfolding of the three-dimensional surface.

In one example, as for a three-dimensional vertex (x1, y1, z1) in the initial three-dimensional head model, after unfolding the outer surface of the initial three-dimensional head model in a two-dimensional plane in the XY direction, the three-dimensional vertex (x1, y1, z1) is converted into one grid vertex (x1, y1) in the two-dimensional plane, that is, a mapping relationship is established between the three-dimensional vertex (x1, y1, z1) and the grid vertex (x1, y1).

Optionally, the initial facial map in the embodiment of the present disclosure may be stored in the model database in association with the initial three-dimensional head model.

In one example, based on the same reference coordinate system, it is determined whether the coordinates of the feature points near the eyes in the facial image are the same or consistent with the coordinates of local grid vertices near the eyes in the initial facial map; and the coordinates of the grid vertices with different or inconsistent coordinates are adjusted to be the same as the coordinates of the corresponding facial local feature points in the facial image. The adjusted personalized facial map is still composed of multiple grids, but the features of some grids conform more to the facial features of real person.

Optionally, on the basis of adjusting the positional features (for example, coordinates) of the map feature points, the adjusting the map feature points on the initial facial map corresponding to the initial three-dimensional head model according to the facial local feature points further includes: determining whether pixel features (for example, colors and brightnesses of pixels) of multiple facial local feature points are consistent with pixel features of the multiple map feature points; adjusting the pixel features of the map feature points with inconsistent pixel features to be consistent with the pixel features of the corresponding facial local feature points.

Figure 11:
FIG. 11 is a schematic diagram of a personalized facial map according to an embodiment of the present disclosure.

Specifically, it is determined whether the pixel values (for example, colors and brightnesses of pixels) of the multiple facial local feature points are the same as the pixel values (for example, colors and brightnesses of pixels) of the multiple map feature points; and the pixel values of the map feature points with different pixel values are adjusted to be the same as the pixel values of the corresponding facial local feature points. The personalized facial map obtained after adjusting of the pixels is shown in FIG. 11.

By the above adjustments, the pixels of the facial image can be copied to the initial facial map, so that the pixels of the personalized facial map are consistent with the facial image, and the display effect (i.e., color, brightness, etc.) of the personalized facial map conform more to the effect of the real facial image, which improves the reality of the facial map.

At step S154, the personalized facial map is assigned to the first three-dimensional head model to obtain a second three-dimensional head model.

Specifically, according to a point positional correspondence relationship between the personalized facial map and the first three-dimensional head model, the personalized facial map is overlaid on the first three-dimensional head model, to obtain a second three-dimensional head model which is another personalized three-dimensional head model conforming to the facial features of the user.

In one example, as for a personalized facial map obtained by adjusting only the positional features of the map feature points in the initial facial map, the second three-dimensional head model can be obtained by assigning this personalized facial map to the first three-dimensional head model shown in FIG. 8.

Figure 12:
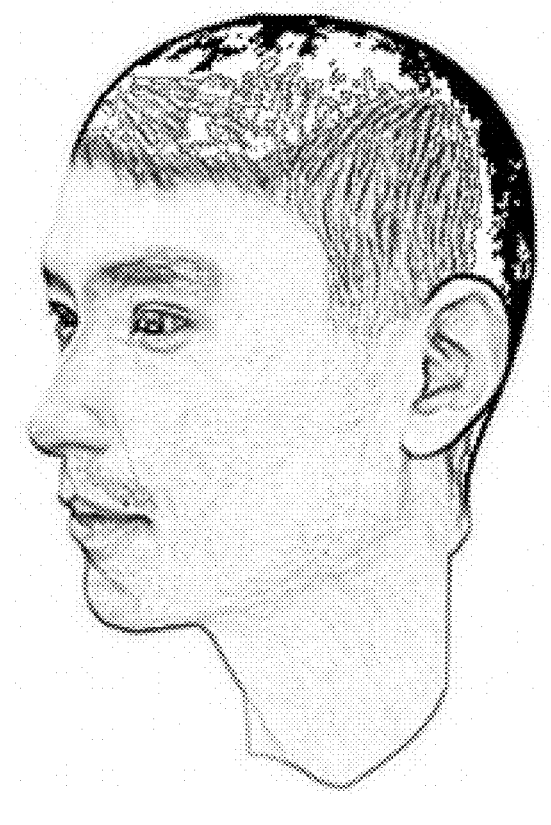
FIG. 12 is a schematic diagram of a second three-dimensional head model according to an embodiment of the present disclosure.

In another example, as for a personalized facial map obtained by adjusting both the positional features and the pixel features of the map feature points in the initial facial map, by assigning this personalized facial map to the first three-dimensional head model shown in FIG. 8, the second three-dimensional head model obtained is shown in FIG. 12. The structure, color, and brightness of the second three-dimensional head model are more consistent with the facial images of real person, thereby presenting the head features of the person more realistically and vividly.

In an optional implementation, in a case that the acquired facial image of the user includes the facial expression features of the user, according to the modeling method for a three-dimensional head model provided in the embodiment of the present disclosure, both of the generated first three-dimensional head model and personalized facial map can reflect facial expressions by recognizing the facial local feature points and by adjusting both of the initial three-dimensional head model and the initial facial map according to the facial local feature points. After assigning the personalized facial map to the first three-dimensional head model, the generated second three-dimensional head model can present the user's facial expressions vividly.

In another optional implementation, after generating a personalized three-dimensional head model (such as the first three-dimensional head model or the second three-dimensional head model), the positions of the bone points of the personalized three-dimensional head model can be further adjusted so as to achieve the purpose of adjusting the facial expressions of the personalized three-dimensional head model. As for the second three-dimensional head model, the positions of the grid vertices of the personalized facial map on the model can be adjusted accordingly to make the expression features reflected by the personalized facial map consistent with the second three-dimensional head model, and then the adjusted personalized facial map is assigned to the second three-dimensional head model to obtain a personalized three-dimensional head model with a certain expression.

Figure 13:
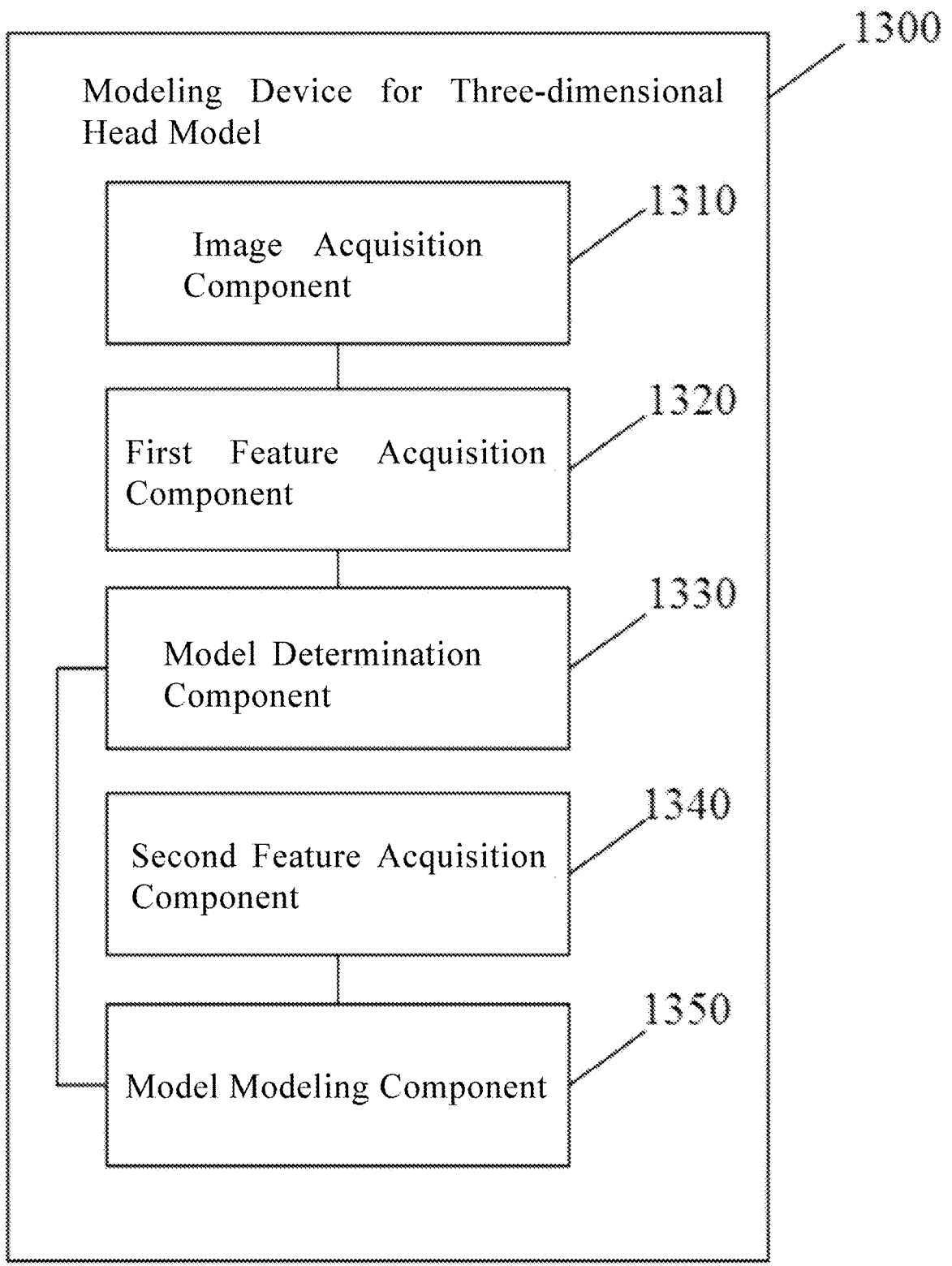
FIG. 13 is a schematic diagram of a modeling device for a three-dimensional head model according to an embodiment of the present disclosure.

Based on the same inventive concept, an embodiment of the present disclosure provides a modeling device for a three-dimensional head model provided. As shown in FIG. 13, the modeling device includes: an image acquisition component 1310, a first feature acquisition component 1320, a model determination component 1330, a second feature acquisition component 1340, and a model modeling component 1350.

The image acquisition component 1310 is configured to acquire at least one facial image of a user; the first feature acquisition component 1320 is configured to acquire facial contour feature points in the at least one facial image of the user, the facial contour feature points being capable of characterizing a contour of a face or contours of five sense organs of the user; the model determination component 1330 is configured to select a standard three-dimensional head model according to the facial contour feature points; the second feature acquisition component 1340 is configured to acquire facial local feature points in the at least one facial image of the user, the facial local feature points being capable of reflecting refined features of face shape and refined features of the five sense organs of the user; the model modeling component 1350 is configured to correct the selected standard three-dimensional head model according to the facial local feature points, to obtain a three-dimensional head model conforming to facial features of the user.

Optionally, the image acquisition component 1310 is specifically configured to acquire a front image and at least one side image of the user.

Optionally, the first feature acquisition component 1320 is specifically configured to recognize facial contour feature points of the user in the at least one facial image according to a trained first image recognition model.

Optionally, the model determination component 1330 is specifically configured to: match coordinates of multiple bone points of a standard three-dimensional head models in a model database with coordinates of the facial contour feature points in the at least one facial image in the same reference coordinate system, the bone points being capable of characterizing the contour of the face or the contours of the five sense organs of the standard three-dimensional head model; select a standard three-dimensional head model from the multiple standard three-dimensional head models such that the coordinates of the bone points of the standard three-dimensional head model has the highest matching degree with the coordinates of the facial contour feature points.

Optionally, the second feature acquisition component 1340 is specifically configured to: according to a trained second image recognition model, recognize the facial local feature points of the user from the at least one facial image.

Figure 14:
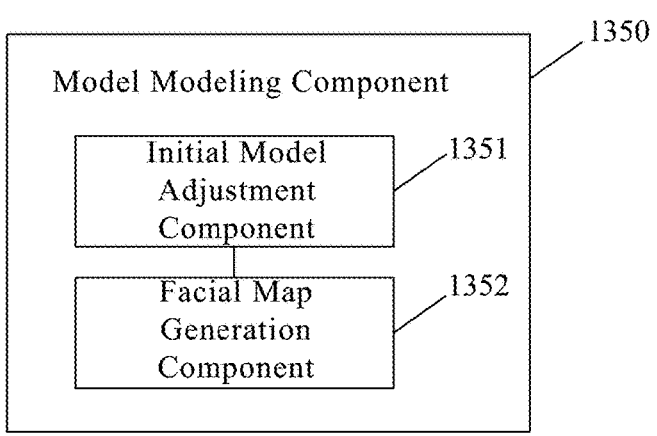
FIG. 14 is a schematic diagram of a model modeling component according to an embodiment of the present disclosure.

Optionally, as shown in FIG. 14, the model modeling component 1350 includes an initial model adjustment component 1351 and a facial map generation component 1352.

Optionally, the initial model adjustment component 1351 is configured to: compare positional features (for example, coordinates) of multiple facial local feature points with positional features (for example, coordinates) of multiple bone points on the selected standard three-dimensional head model under the same reference coordinate system; adjust the coordinates of the bone points with inconsistent coordinates to be consistent with the coordinates of the corresponding facial local feature points, to obtain an adjusted first three-dimensional head model.

Optionally, the facial map generation component 1352 is configured to: generate a personalized facial map conforming to the facial features of the user according to the multiple facial local feature points; assign the personalized facial map to the first three-dimensional head model to obtain a second three-dimensional head model.

Optionally, the facial map generation component 1352 is specifically configured to: adjust map feature points on the initial facial map having a mapping relationship with the initial three-dimensional head model according to the facial local feature points, to generate an adjusted personalized facial map.

Optionally, the facial map generation component 1352 is specifically configured to: determine whether the positional features (for example, coordinates) of multiple facial local feature points are consistent with the positional features (for example, coordinates) of the multiple map feature points; and adjust the coordinates of the map feature points with inconsistent coordinates to be consistent with the coordinates of the corresponding facial local feature points.

Optionally, the facial map generation component 1352 is further specifically configured to: determine whether pixel features (for example, colors and brightnesses of pixels) of the multiple facial local feature points are consistent with pixel features (for example, colors and brightnesses of pixels) of the multiple map feature points; adjust the pixel features of the map feature points with inconsistent pixel features to be consistent with the pixel features of the corresponding facial local feature points.

The modeling device 1300 for a three-dimensional head model in the embodiment can execute any modeling method for a three-dimensional head model provided in the embodiments of the present disclosure, and its implementation principle is similar. For the content not shown in detail in this embodiment, please refer to the aforementioned embodiments, which will not be repeated here.

Figure 15:
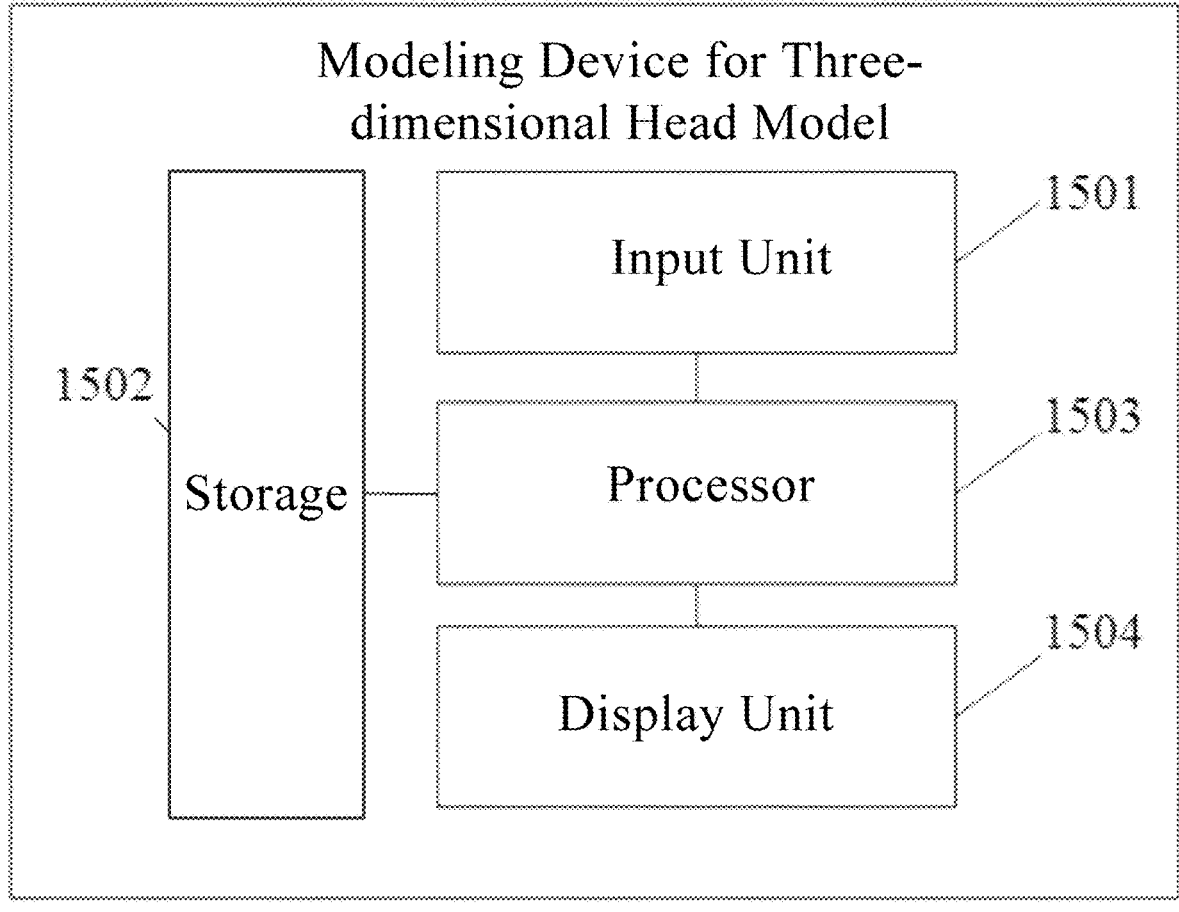
FIG. 15 is a schematic diagram of a modeling system for a three-dimensional head model according to an embodiment of the present disclosure.

Based on the same inventive concept, an embodiment of the present disclosure provides a modeling system for a three-dimensional head model. As shown in FIG. 15, the modeling system includes: an input unit 1501, a storage 1502, a processor 1503, and a display unit 1504. The input unit 1501, the storage 1502 and the display unit 1504 are all electrically connected to the processor 1503. The structural framework of the modeling system for a three-dimensional head model 1500 shown in FIG. 15 does not constitute a limitation to the embodiment of the present disclosure.

The input unit 1501 is configured to acquire at least one facial image of a user; the storage 1502 stores a computer program, which is executed by the processor 1503 to implement modeling method for a three-dimensional head model provided by any one of the embodiments of the present disclosure; the display unit 1504 is configured to display the personalized three-dimensional head model constructed by the processor according to the modeling method for a three-dimensional head model.

Optionally, the storage 1502 further stores a model database, and the model database stores multiple standard head models.

Optionally, the storage 1502 further stores a program of a three-dimensional processing software such as 3dMax or Unity. The program of the three-dimensional processing software is invoked by the processor 1503 to execute the corresponding processing on the facial image and the three-dimensional head model, and then the display unit 1504 performs real-time display.

Optionally, the storage 1502 further stores at least one facial image or other image information of the user.

In an optional implementation, the modeling system for a three-dimensional head model in the embodiment of the present disclosure is specifically a separate terminal device, which may be an electronic device with strong computing power such as a desktop computer, a notebook computer, or a two-in-one computer.

In another optional implementation, the modeling system for a three-dimensional head model in the embodiment of the present disclosure includes a cloud device and a terminal device that are communicatively connected to each other. The cloud device can be an electronic device with strong computing power such as a single server, a server cluster, or a distributed server. The cloud device has a processor that can execute the aforementioned modeling method for a three-dimensional head model; the terminal device can be an electronic device with weak computing power such as a smartphone or a tablet computer. The terminal device has an input unit, a storage, a processor, and a display unit.

Figure 16:
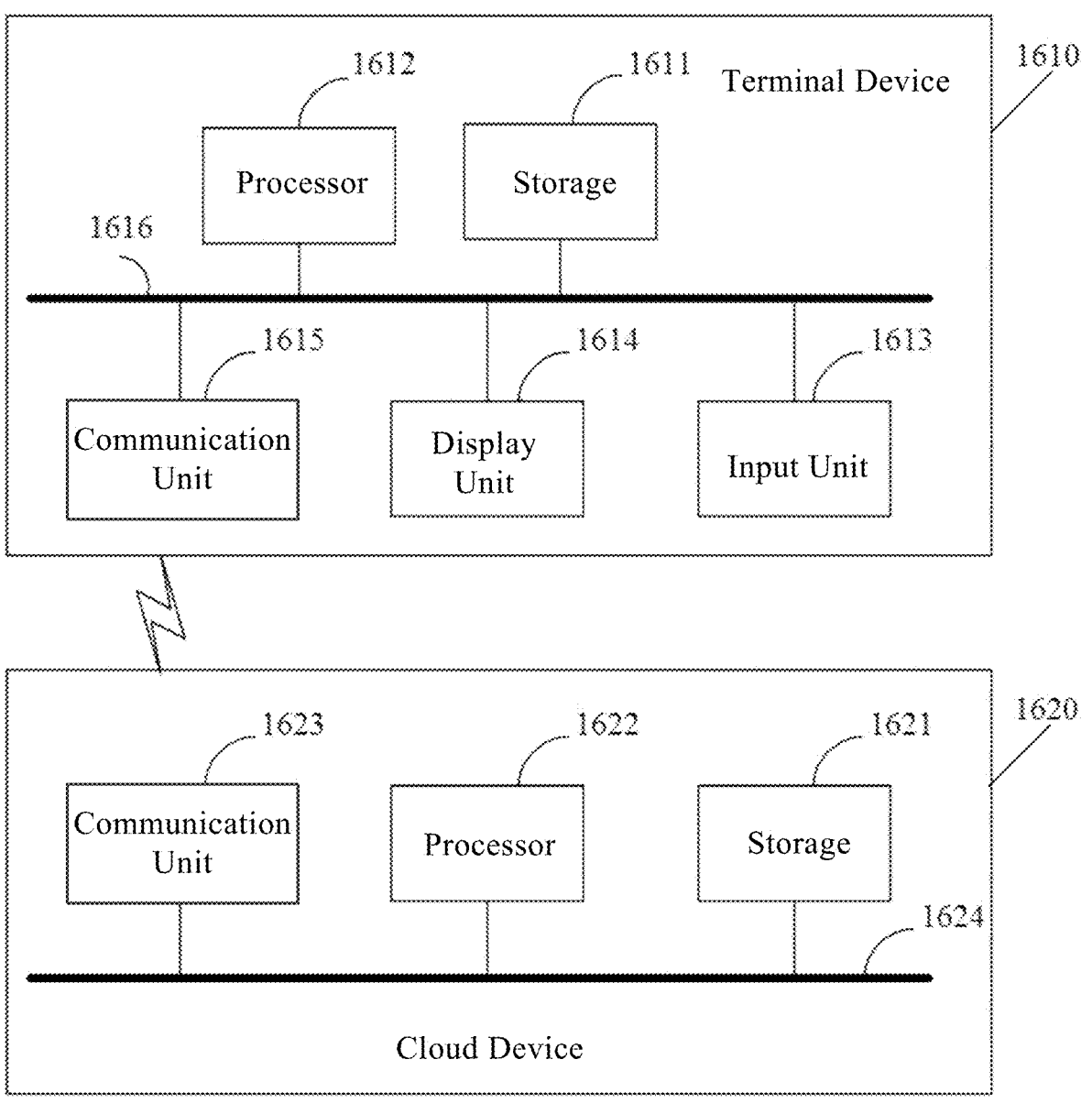
FIG. 16 is a schematic diagram of a modeling system for a three-dimensional head model according to an embodiment of the present disclosure.

FIG. 16 shows a schematic diagram of a modeling system for a three-dimensional head model provided by an embodiment of the present disclosure. As shown in FIG. 16, the modeling system includes a terminal device 1610 and a cloud device 1620.

The terminal device 1610 shown in FIG. 16 includes a storage 1611, a processor 1612, an input unit 1613, a display unit 1616, and a communication unit 1615, which are electrically connected through a bus 1616; the cloud device 1620 shown in FIG. 16 includes a storage 1621, a processor 1622 and a communication unit 1623, which are electrically connected through a bus 1624.

Optionally, the storage 1621 stores a computer program and is controlled by the processor 1622 for execution; the processor 1622 executes the computer program.

The storage (e.g., the storage 1502, the storage 1611 and the storage 1621) in the embodiment of the present disclosure can be a ROM (Read-Only Memory) or other types of static storage devices that can store static information and instructions, a RAM (Random Access Memory) or other types of dynamic storage devices that can store information and instructions, or can be an EEPROM (Electrically Erasable Programmable Read Only Memory), a CD-ROM (Compact Disc Read-Only Memory) or other optical disk storage, an optical disc storage (including a compact disc, laser disc, optical disc, digital versatile disc, Blu-ray disc, etc.), a magnetic disk storage medium or other magnetic storage devices, or any other medium which can be used to carry or store desired program codes in the form of instructions or data structures and can be accessed by a computer, but which is not limited to this.

The processor (e.g., the processor 1503, the processor 1612 and the processor 1622) in the embodiment of the present disclosure can be a CPU (Central Processing Unit), a general-purpose processor, a DSP (Digital Signal Processor), an ASIC (Application Specific Integrated Circuit), an FPGA (Field-Programmable Gate) Array) or other programmable logic devices, transistor logic devices, hardware components or any combination thereof. It can implement or execute various exemplary logical blocks, components and circuits described in conjunction with the content of the present disclosure; it can also be a combination that implements computing functions, for example, including a combination of one or more microprocessors, a combination of a DSP and a microprocessor, and so on. A processor with a higher computing power than the processor 1612 can be selected as the processor 1622.

In an optional implementation, the input unit (e.g., the input unit 1501 and the input unit 1613) in the embodiment of the present disclosure may receive input image information. Specifically, the input unit may include a camera device that can capture the user's facial image and other image information. The camera device may be provided in the main structure of the terminal device, or may be separately provided outside the main structure of the terminal device and communicate with other units in the terminal device in a wired or wireless manner.

The communication unit (e.g., the communication unit 1615 and the communication unit 1623) in the embodiment of the present disclosure may receive and transmit signals, in particular, to receive downlink information of the cloud device and transmit it to the processor for processing; in addition, it sends uplink data to the cloud device.

Based on the same inventive concept, an embodiment of the present disclosure provides a computer storage medium with a computer program stored thereon. When executed by a processor, the computer program implements any modeling method for a three-dimensional head model provided by the embodiments of the present disclosure.

The computer storage medium includes, but is not limited to, any type of disk (including floppy disk, hard disk, optical disk, CD-ROM, and magneto-optical disk), a ROM, a RAM, an EPROM (Erasable Programmable Read-Only Memory), an EEPROM, a flash memory, a magnetic card or light card. That is, the storage medium includes any medium that stores or transmits information in a readable form by a device (for example, a computer).

The embodiments of the present disclosure, when applied, have at least the following beneficial effects:

1) In the embodiments of the present disclosure, the initial three-dimensional head model that conforms to the facial contour feature points is determined by using the facial contour feature points acquired in the facial image, and then the initial three-dimensional head model is locally fine-tuned by using the facial local feature points to obtain a three-dimensional head model with a complete structure, which has a higher matching degree with the head of the real person, and can achieve more accurate personalized process, so that the contour and local detail features of the personalized three-dimensional head model are consistent with the real person; it is unnecessary to process all the sides or points of the three-dimensional head mode; it not only obtains high-quality models, improves reality and inter-activity, but also effectively reduces the amount of calculations, reduces the dependence on the server, and increases the transmission speed, which is conducive to real-time display and deformation and rapid comple-tion of dynamic animations, so as to achieve rapid product implementation.

2) The embodiments of the present disclosure extract facial contour feature points and facial local feature points in a facial image based on the principle of deep learning, which improves the accuracy and efficiency of feature extraction.

3) In the embodiments of the present disclosure, when determining the initial three-dimensional head model, the facial contour feature points are matched with various standard head models in the model database without reconstructing the standard head model, which improves the modeling speed; specifically, the facial contour feature points are matched with a small number of bone points in the standard head model, instead of matching the facial contour feature points with a large number of points and sides on the surface of the model, which greatly reduces the amount of calculation; based on the skin weight, the bone points of the standard head model are used as the reference for matching, which can reduce the amount of calculation while still ensur-ing the accuracy of the matching.

3) In the embodiments of the present disclosure, when correcting the local structure of the initial three-dimen-sional head model, the bone points of the initial three-dimensional head model are corrected according to the facial local feature points, and the associated model structure changes with the bone points, which reduces the points that need to be corrected, reduces the amount of calculation and realizes the overall structure adjust-ment of the model at the same time, so that the structure of the resulting personalized three-dimensional head model conforms more to the characteristics of the head structure of the real person.

4) In the embodiments of the present disclosure, when the local structure of the initial three-dimensional head model is corrected according to the facial local feature points, both the local skeletal structure of the initial three-dimensional head model and the initial facial map corresponding to the initial three-dimensional head model are corrected, so that both the structure and appearance of the resulting personalized three-dimen-sional head model conform more to the characteristics of the head structure of the real person.

5) The technical solutions of the embodiments of the present disclosure can realize real-time interaction with users, and have a wide range of applications including those in the terminal devices and in the overall archi-tecture including terminal devices and cloud devices.

It will be appreciated that the above implementations are merely exemplary implementations used to illustrate the principle of the present disclosure, and the present disclo-sure is not limited thereto. For those of ordinary skill in the art, various modifications and improvements can be made without departing from the spirit and essence of the present disclosure, and these modifications and improvements are also regarded as the protection scope of the present disclo-sure.

What is claimed is:

1. A modeling method for a three-dimensional head model, comprising:

acquiring at least one facial image of a user;

acquiring facial contour feature points in the at least one facial image of the user, the facial contour feature points being capable of characterizing a contour of a face or contours of five sense organs of the user;

selecting, from a plurality of standard three-dimensional head models constructed in advance and stored in a model database, a standard three-dimensional head model according to the facial contour feature points;

acquiring facial local feature points in the at least one facial image of the user, the facial local feature points being capable of reflecting refined features of face shape and refined features of the five sense organs of the user; and correcting the selected standard three-dimensional head model according to the facial local feature points, to obtain a three-dimensional head model conforming to facial features of the user, wherein the correcting the selected standard three-dimen-sional head model according to the facial local feature points comprises:

comparing coordinates of multiple facial local feature points in the at least one facial image with coordinates of multiple bone points of the selected standard three-dimensional head model under a same reference coor-dinate system; and adjusting the coordinates of a bone point with inconsistent coordinates in the selected standard three-dimensional head model to be consistent with the coordinates of a corresponding facial local feature point, to obtain an adjusted first three-dimensional head model, wherein correcting the selected standard three-dimen-sional head model according to the facial local feature points to obtain the three-dimensional head model conforming to the facial features of the user further comprises:

unfolding, in a two-dimensional plane, an entire outer surface of the selected standard three-dimensional head model to obtain a 2D initial facial map, the 2D initial facial map being a 2D UV texture map composed of multiple grids, the 2D initial facial map comprising multiple map feature points, wherein the multiple map feature points are vertices of the multiple grids of the 2D UV texture map and are used to characterize the positions of the five sense organs, and the vertices of the multiple grids of the 2D initial facial map being one-to-one correspondence with three-dimensional vertices on the selected standard three-dimensional head model; and adjusting the vertices on the 2D UV texture map according to the multiple facial local feature points on the facial image of the user, to generate the adjusted 2D UV texture map; and overlaying the adjusted 2D UV texture map on the first three-dimensional head model according to a one-to-one correspondence relationship between the vertices on the 2D UV texture map and the multiple bone points of the first three-dimensional head model, to obtain the three-dimensional head model of the user.

2. The modeling method of claim 1, wherein selecting, from the plurality of standard three-dimensional head models constructed in advance and stored in the model database, the standard three-dimensional head model according to the facial contour feature points comprises:

matching coordinates of multiple bone points of the plurality of standard three-dimensional head models constructed in advance and stored in the model database with coordinates of the facial contour feature points in the at least one facial image under a same reference coordinate system, the bone points being capable of characterizing a contour of a face or contours of five sense organs of a standard three-dimensional head model; and selecting a standard three-dimensional head model from multiple standard three-dimensional head models such that the coordinates of the bone points of the selected standard three-dimensional head model have a highest matching degree with the coordinates of the facial contour feature points.

3. The modeling method of claim 1, wherein adjusting the vertices on the 2D UV texture map according to the multiple facial local feature points on the facial image of the user comprises:

determining whether the coordinates of the multiple facial local feature points on the facial image of the user are consistent with coordinates of the vertices on the 2D UV texture map; and adjusting coordinates of a vertice having the coordinates inconsistent with the coordinates of the multiple facial local feature points on the facial image of the user to be consistent with the coordinates of a corresponding facial local feature point on the facial image of the user, both of the vertice and the corresponding facial local feature point being capable of characterizing a same position of a same sense organ.

4. The modeling method of claim 1, wherein adjusting the multiple map feature points on the initial facial map according to the multiple facial local feature points comprises:

determining whether colors and brightnesses of pixels at the multiple facial local feature points are consistent with colors and brightnesses of pixels at the multiple map feature points, respectively; and adjusting the color and brightness of a map feature point with inconsistent color and brightness in the initial facial map to be consistent with the color and brightness of a corresponding facial local feature point.

5. The modeling method of claim 2, wherein selecting the standard three-dimensional head model from the model database such that the coordinates of the bone points of the standard three-dimensional head model have a highest matching degree with the coordinates of the facial contour feature points comprises:

comparing first coordinates of a bone point of the standard three-dimensional head model with second coordinates of a corresponding facial contour feature point in a same reference coordinate system, wherein the bone point and the corresponding facial contour feature point are capable of characterizing a same position on the contour of the face or on the contours of the five sense organs; and determining whether a difference between the first coordinates and the second coordinates is within a first threshold, and if the difference falls within the first threshold, the matching degree is high.

6. The modeling method of claim 1, wherein acquiring the at least one facial image of the user comprises:

capturing a front image and at least one side image of the user.

7. The modeling method of claim 1, wherein the acquiring the at least one facial image of the user comprises:

acquiring a front image and at least one side image of the user that are stored in advance.

8. The modeling method of claim 1, wherein acquiring the facial contour feature points in the at least one facial image of the user comprises:

recognizing the facial contour feature points of the user in the at least one facial image according to a trained first image recognition model.

9. The modeling method of claim 1, wherein acquiring the facial local feature points in the at least one facial image of the user comprises:

recognizing the facial local feature points of the user in the at least one facial image according to a trained second image recognition model.

10. A modeling device for a three-dimensional head model, comprising:

an image acquisition component configured to acquire at least one facial image of a user;

a first feature acquisition component configured to acquire facial contour feature points in the at least one facial image of the user, the facial contour feature points being capable of characterizing a contour of a face or contours of five sense organs of the user;

a model determination component configured to select, from the plurality of standard three-dimensional head models constructed in advance and stored in the model database, a standard three-dimensional head model according to the facial contour feature points;

a second feature acquisition component configured to acquire facial local feature points in the at least one facial image of the user, the facial local feature points being capable of reflecting refined features of face shape and refined features of the five sense organs of the user; and a model modeling component configured to correct the selected standard three-dimensional head model according to the facial local feature points, to obtain a three-dimensional head model conforming to facial features of the user, wherein the model modeling component is further configured to:

compare coordinates of multiple facial local feature points in the at least one facial image with coordinates of multiple bone points of the selected standard three-dimensional head model under a same reference coordinate system; and adjust the coordinates of a bone point with inconsistent coordinates in the selected standard three-dimensional head model to be consistent with the coordinates of a corresponding facial local feature point, to obtain an adjusted first three-dimensional head model, wherein the model modeling component is further configured to:

unfold, in a two-dimensional plane, an entire outer surface of the selected standard three-dimensional head model to obtain a 2D initial facial map, the 2D initial facial map being a 2D UV texture map composed of multiple grids, the 2D initial facial map comprising multiple map feature points, wherein the multiple map feature points are vertices of the multiple grids of the 2D UV texture map and are used to characterize the positions of the five sense organs, and the vertices of the multiple grids of the 2D initial facial map being one-to-one correspondence with three-dimensional vertices on the selected standard three-dimensional head model; and adjust the vertices on the 2D UV texture map according to the multiple facial local feature points on the facial image of the user, to generate the adjusted 2D UV texture map; and overlay the adjusted 2D UV texture map on the first three-dimensional head model according to a one-to-one correspondence relationship between the vertices on the 2D UV texture map and the multiple bone points of the first three-dimensional head model, to obtain the three-dimensional head model of the user.

11. A modeling system for a three-dimensional head model, comprising: an input unit, a storage, a processor and a display unit; wherein the input unit, the storage and the display unit are all electrically connected to the processor, the input unit is configured to acquire at least one facial image of a user;

the storage is configured to store a computer program, when executed by the processor, the computer program implementing the modeling method for a three-dimensional head model of claim 1, and the display unit is configured to display a three-dimensional head model constructed by the processor according to the modeling method for a three-dimensional head model.

12. The modeling system of claim 11, wherein the storage is further configured to store a model database with multiple standard three-dimensional head models stored therein.

13. A non-transitory computer storage medium storing a computer program, when executed by a processor, the computer program implementing the modeling method for a three-dimensional head model of claim 1.

14. The modeling method of claim 3, wherein adjusting the vertices on the 2D UV texture map on the initial facial map according to the multiple facial local feature points comprises:

determining whether colors and brightnesses of pixels at the multiple facial local feature points are consistent with colors and brightnesses of pixels at the vertices on the 2D UV texture map, respectively; and adjusting the color and brightness of a map feature point with inconsistent color and brightness in the initial facial map to be consistent with the color and brightness of a corresponding facial local feature point.

*   *   *   *   *